(12) United States Patent
Brückner

(10) Patent No.: US 9,925,861 B2
(45) Date of Patent: Mar. 27, 2018

(54) RADIATOR SYSTEM FOR A VEHICLE

(71) Applicant: HBPO GmbH, Lippstadt (DE)

(72) Inventor: Reinhold Brückner, Herzebrock-Clarholz (DE)

(73) Assignee: HBPO GmbH, Lippstadt (DE)

( * ) Notice: Subject to any disclaimer, the term of this patent is extended or adjusted under 35 U.S.C. 154(b) by 0 days.

(21) Appl. No.: 15/184,767

(22) Filed: Jun. 16, 2016

(65) Prior Publication Data

US 2016/0368368 A1    Dec. 22, 2016

(30) Foreign Application Priority Data

Jun. 17, 2015   (DE) .................. 10 2015 109 698

(51) Int. Cl.
  *B60K 11/04*    (2006.01)
  *B60K 11/08*    (2006.01)
  *F01P 7/10*     (2006.01)

(52) U.S. Cl.
  CPC ............ *B60K 11/085* (2013.01); *B60K 11/04* (2013.01); *F01P 7/10* (2013.01); *F01P 2070/52* (2013.01)

(58) Field of Classification Search
  CPC ............................. B60K 11/08; B60K 11/085
  USPC ............................ 180/68.1, 68.2, 68.4, 68.6
  See application file for complete search history.

(56) References Cited

U.S. PATENT DOCUMENTS

| | | | |
|---|---|---|---|
| 8,281,754 B2* | 10/2012 | Saida ................... | B60K 11/085 123/41.04 |
| 8,505,660 B2* | 8/2013 | Fenchak .............. | B60K 11/085 180/68.1 |
| 8,517,130 B2* | 8/2013 | Sakai ................... | B60K 11/085 180/68.1 |
| 8,627,911 B2* | 1/2014 | Tregnago ............. | B60K 11/085 180/68.1 |
| 8,689,917 B2* | 4/2014 | Miesterfeld ............... | F01P 7/10 180/68.1 |
| 8,708,078 B2* | 4/2014 | Charnesky ........... | B60K 11/085 180/68.4 |

(Continued)

FOREIGN PATENT DOCUMENTS

| | | |
|---|---|---|
| DE | 7134230 U | 1/1972 |
| DE | 7421585 U | 11/1974 |

(Continued)

OTHER PUBLICATIONS

English translation of examination report for German application No. DE 10 2012 109 698.6 dated Mar. 23, 2016, 4 pages.

*Primary Examiner* — Jeffrey J Restifo

(74) *Attorney, Agent, or Firm* — Rudy J. Ng; Bret E. Field; Bozicevic, Field & Francis LLP

(57) ABSTRACT

Provided is a radiator system (1) for a vehicle comprising a radiator device (2) for cooling at least one vehicle component of the vehicle, and at least one regulation device (10) for regulating an airflow (4) to the radiator device (2) wherein the regulation device (10) comprises at least one support element (20) for the acceptance of at least one cover element (15), and wherein the airflow (4) is guidable to the radiator device (2) through at least one opening (5) of the regulation device (10). It is provided that the regulation device (10) is directly assembled at the radiator device (2) in a way that the airflow (4) is guidable to the radiator device (2) directly through the regulation device (10).

19 Claims, 5 Drawing Sheets

(56) References Cited

U.S. PATENT DOCUMENTS

| | | | | |
|---|---|---|---|---|
| 8,794,360 B2* | 8/2014 | Nemoto | | B60K 11/085 180/68.1 |
| 8,825,308 B2* | 9/2014 | Nishimura | | B60H 1/3208 180/68.1 |
| 8,833,498 B2* | 9/2014 | Charnesky | | F01P 7/10 180/68.1 |
| 8,863,871 B2* | 10/2014 | Kobayashi | | B60L 11/1896 180/65.31 |
| 8,936,121 B2* | 1/2015 | Vacca | | B60K 11/04 165/44 |
| 8,983,735 B2* | 3/2015 | Konishi | | B60K 11/085 123/41.04 |
| 8,983,736 B2* | 3/2015 | Hirota | | B60K 11/085 123/41.04 |
| 9,333,850 B2* | 5/2016 | Ruppert | | B60R 19/52 |
| 2010/0071977 A1* | 3/2010 | Ritz | | B60K 11/085 180/68.1 |
| 2010/0243351 A1* | 9/2010 | Sakai | | B60K 11/085 180/68.1 |
| 2010/0243352 A1* | 9/2010 | Watanabe | | B60K 11/085 180/68.1 |
| 2010/0282533 A1* | 11/2010 | Sugiyama | | B60K 11/085 180/68.1 |
| 2011/0097984 A1* | 4/2011 | Hasegawa | | B60K 11/085 454/152 |
| 2012/0074729 A1* | 3/2012 | Fenchak | | B60K 11/085 296/193.1 |
| 2012/0091757 A1* | 4/2012 | Tregnago | | B60K 11/085 296/193.1 |
| 2012/0132474 A1* | 5/2012 | Charnesky | | B60K 11/085 180/68.1 |
| 2012/0241128 A1* | 9/2012 | Vacca | | B60K 11/085 165/44 |
| 2012/0312611 A1* | 12/2012 | Van Buren | | B60K 11/085 180/68.1 |
| 2013/0075172 A1* | 3/2013 | Hori | | B60K 11/085 180/68.1 |
| 2013/0092462 A1* | 4/2013 | Chinta | | B60K 11/08 180/68.1 |
| 2013/0092463 A1* | 4/2013 | Hori | | B60K 11/085 180/68.1 |
| 2013/0110356 A1* | 5/2013 | Konishi | | B60K 11/085 701/49 |
| 2013/0126253 A1* | 5/2013 | Saito | | B60K 11/085 180/68.1 |
| 2013/0248266 A1* | 9/2013 | Asano | | B60K 11/04 180/68.1 |
| 2013/0264133 A1* | 10/2013 | Remy | | B60K 11/085 180/68.1 |
| 2014/0102817 A1* | 4/2014 | Asano | | B60K 11/085 180/68.1 |
| 2014/0132033 A1* | 5/2014 | Townson | | B62D 25/084 296/193.1 |
| 2014/0216834 A1* | 8/2014 | Elliott | | B60K 11/085 180/68.1 |
| 2014/0291056 A1* | 10/2014 | Takanaga | | B60K 11/085 180/274 |
| 2015/0231962 A1* | 8/2015 | Ruppert | | B60K 11/085 180/68.1 |
| 2015/0239337 A1* | 8/2015 | Anderson | | B60K 11/04 180/68.1 |
| 2015/0274002 A1* | 10/2015 | Vacca | | B60K 11/085 180/68.1 |
| 2015/0343894 A1* | 12/2015 | Yoshioka | | B60K 11/06 180/68.1 |
| 2016/0040634 A1* | 2/2016 | Haight | | B01D 46/0083 95/26 |
| 2016/0368367 A1* | 12/2016 | Schoning | | B60R 19/48 |
| 2016/0368368 A1* | 12/2016 | Bruckner | | B60K 11/085 |
| 2017/0001514 A1* | 1/2017 | Watari | | B60R 19/52 |

FOREIGN PATENT DOCUMENTS

| | | |
|---|---|---|
| DE | 3438709 C1 | 4/1986 |
| DE | 3701584 A1 | 8/1988 |
| DE | 102005011814 A1 | 9/2006 |
| DE | 102006053883 A1 | 5/2008 |
| DE | 102009043064 A1 | 5/2010 |
| DE | 102013222489 A1 | 5/2014 |
| DE | 102013204007 A1 | 9/2014 |
| DE | 202015100764 U1 | 3/2015 |
| WO | WO2008002265 A1 | 1/2008 |

* cited by examiner

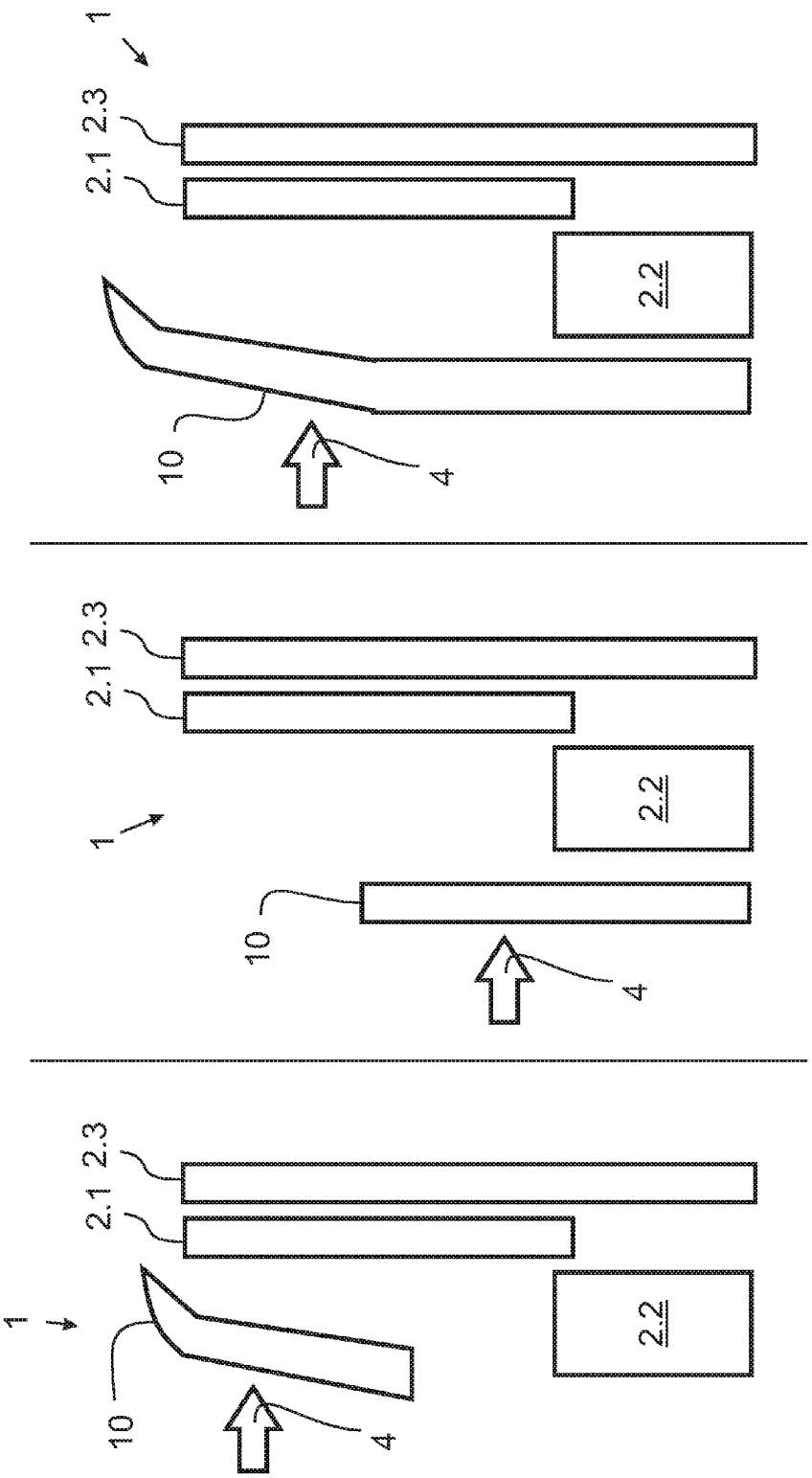

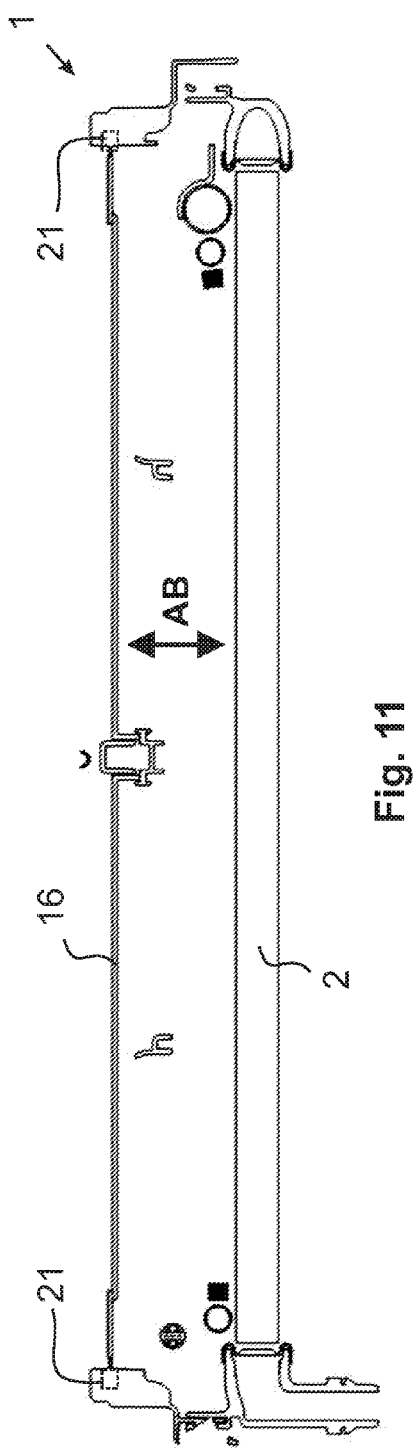
Fig. 11
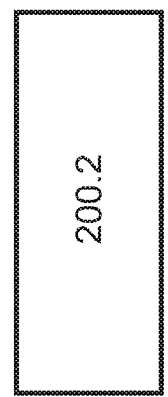
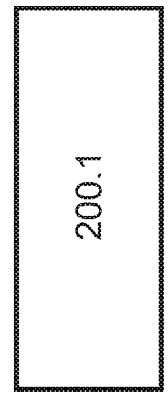
Fig. 12

RADIATOR SYSTEM FOR A VEHICLE

FIELD

The present invention relates to a radiator system according to a manner defined in the generic term of claim 1. Further, the invention relates to a relation device according to the generic term of claim 12 and a method according to the generic term of claim 14.

BACKGROUND

It is known to use regulation devices for regulating an airflow to a radiator device of a vehicle. The radiator device is thereby, for example, a radiator of the vehicle which serves for cooling an engine. The regulation of the air inlet occurs thereby through an alteration of the cross section of the opening of the airflow through cover elements. The cover elements are thereby configured for example as ventilation flaps and can thereby be moved in a closed position for closing the opening and in an open position for the release of the opening. The regulation of the airflow effects thereby that through a temporary reduction of the air inlet the operating temperature of the engine can be achieved faster. Further, the aerodynamic properties of the vehicle can be improved for example at high speeds since an air cushion can be reduced in the area of the opening.

Conventional regulation devices are normally assembled directly at the mounting support or at the vehicle structure of the vehicle. Further, it is known that conventional regulation devices for mounting at the vehicle are assembled at the bumper cover behind the air inlet of the lower and/or the upper radiator protection grids. Disadvantageously, a distance relevant for the air guidance of the airflow between the regulation device and the radiator device results. Thus, additional precautions have to be taken in order to ensure the air guidance to the cooler net surface of the radiator device of the vehicle. Hereby, a higher mounting effort and additional cost result. Further, a complex adjustment of the components of the radiator system is necessary, wherein particularly the error rate is increased.

SUMMARY

Object of the present invention is therefore to at least partially avoid the previous described disadvantages. Particularly, it is object of the present invention to enable an improved assembly and/or mounting of the regulation device at the radiator device. Particularly, the regulation of the airflow through the regulation device should be improved and/or simplified. Further, particularly the reliability of the radiator system for regulating the airflow should be increased and the cost effort should be reduced.

The previous object is solved by a radiator system with the features of claim 1, a regulation device with the features of claim 12 and a method with the features of claim 14. Further features and details of the invention result from the respective depending claims, the description and the drawings. Thereby, features and details which are described in relation to the radiator system according to the invention naturally also occur in relation to the regulation device according to the invention and the method according to the invention and vice versa, such that according to the disclosure of the single aspects of the invention it can always be reciprocally related to.

The object is particularly solved by a radiator system for a vehicle comprising:
- a radiator device for cooling of at least one vehicle component of the vehicle,
- at least one regulation device for regulating an airflow to the radiator device, wherein the regulation device comprises at least one support element for the acceptance of at least one cover element and wherein the airflow is guidable through at least one opening of the regulation device to the radiator device. The cover element hereby serves particularly for covering the opening or the radiator device (in a closed position) for regulating the airflow wherein the airflow is preferably a flow of fresh air which is guided from outside into the vehicle (for example, through a cooling grid). Hereby, it is intended that the regulation device is directly assembled at the radiator device in a way that the airflow is guidable directly through the regulation device to the radiator device. Hereby, the advantage is achieved that the regulation of the airflow is simplified and reliably performable. The vehicle can thereby particularly be a motor vehicle and/or an automobile and/or a commercial vehicle. The vehicle component is preferably a gear component of the vehicle, particularly an engine and/or a combustion engine and/or an electro motor. Further, it is possible that the radiator system comprises at least two or at least three regulation devices which are assembled, for example, particularly along or in direction of the vehicle vertical axis above one another or vertically. As an opening, for example particularly the openings of the regulation device, can be considered, meaning for example the openings between the cover element (in the open position) which are sufficient for guidance and/or passage of the airflow. It is further possible that the radiator system according to the invention only comprises a regulation device and/or at least two regulation devices wherein, particularly, all regulation devices of the radiator system (or the vehicle) are directly connected to the radiator device for regulating the airflow to the radiator device.

In contrast to known regulating devices which only have the function to regulate the airflow and in contrast to known radiator systems which often comprise passage-like air guidances (air passages), for example configured by walls for guiding the airflow, for example from the radiator grill to the regulation device and/or from the regulation device to the radiator grill, the radiator system according to the invention and/or the regulation device according to the invention can particularly comprise such a configuration and/or attachment that the airflow is conductible and/or guidable through the regulation device within the sense of an air passage. Herefore, the regulation device is preferably directly connected to the radiator device and/or comprises a passage-like and/or wavy and/or air tight and/or a configuration supplemented by walls. With other words the regulation device receives the additional function to conduct and/or to guide the airflow, particularly like an air passage to the air guidance. This can occur additionally to existing air passages or alternatively the regulation device can at least partially replace an in other respects necessary air passage. The radiator system in this case is preferably configured at least partially air passage-free. The guidance of the airflow to the radiator device occurs thereby particularly direct, meaning that preferably between the regulation device and the radiator device no other (neighbouring or separately configured from the regulation device) essential auxiliary means or air passages for the guidance of the airflow to the radiator device are intended. Herefore, the regulation device is directly, meaning particularly tightly, connected at the radiator device.

It is further possible that the support element comprises at least one arresting means for the direct assembly at the radiator device, wherein particularly the arresting means is configured for the assembly by clips and/or screws. Herefore, the arresting means preferably comprise (at least partially configured circular) openings for the acceptance and/or guidance of for example screws. Further, plug connections and/or latching connections or clips connections and/or suchlike are possible as arresting means. The arresting means can thereby be resolvably or irresolvably connected to the support element and/or configure a monolithic (one piece) and/or a component of the same material as the support element. Hereby, the advantage is achieved that a simple mounting and a secure assembly of the regulation device at the radiator device is possible.

It can further be intended that the radiator device is a water cooler of the vehicle wherein preferably the support element is directly assembled at the plastic water boxes (water tanks) of the water cooler. Alternatively or additionally, it is possible that the regulation device according to the invention or further (second or third or other) regulation devices according to the invention of the radiator system according to the invention are assembled at other or further components of the radiator device. The components of the radiator device can thereby for example be a capacitor and/or intercooler or suchlike. The assembly thereby occurs directly such that particularly no air guidance like an air passage is intended between the regulation device and the radiator device. This enables a particularly reliable air guidance and assembly at the radiator device.

Further, it can be intended within the scope of the invention that the regulation device is assembled at the radiator device in a way that the carrier element is at least partially tightly tied to the radiator device wherein particularly the support element at least partially directly contacts the radiator device. The tight connection of the regulation device to the radiator device occurs preferably in a way that at least predominantly or completely no air outlet, particularly in the area of the connection, is possible and the airflow therewith is at least predominantly or completely guided from the (passing) opening of the regulation device to the radiator device. Herefore for example a sealing means between the regulation device and the radiator device can be intended which is configured separately or as part of the radiator device. The sealing means for example comprises an elastic material, particularly plastic, which is particularly more elastic than the material or the plastic of the support element. Further, it is possible that the support element directly contacts the radiator device, particularly in a way that the air outlet at the contact point is prevented. This occurs for example by an adjustment of the geometry of the support element to the geometry of the corresponding connection point at the radiator device. Therewith a reliable guidance of the airflow is achieved.

Further, it can be intended within the scope of the invention that the support element and/or at least a cover element of the regulation device is configured as a casting (moulding injection) component, wherein particularly the support element and at least an arresting means for the direct assembly at the radiator device configure a monolithic component. The arresting means can thereby for example be configured as a guidance and/or as an acceptance for screws or as a latching means. Hereby, a reliable assembly of the regulation device to the radiator device can be achieved.

Advantageously, it can be intended with the invention that the regulation device, particularly in the closed position, particularly through the cover element, covers at least 20% to 60% of the radiator net area of the radiator device. Further, it is possible that the regulation device covers at least 40% to 50% and/or at least 10% to 90% and/or mainly 100% of the radiator net area. Alternatively or additionally it can be intended that the regulation device regulates and/or guides at least 20% to 60% and/or at least 40% to 50% and/or at least 10% to 90% and/or mainly 100% of the total airflow to the regulator device. The remaining airflow is for example guided through a separate air passage. Hereby, the aerodynamic properties of the vehicle can be optimally determined and a cooling can optimally occur.

Further, it is possible that the regulation device configures an air passage (air channel) for a guidance of the airflow to the radiator device, wherein particularly the distance between the cover element of the regulation device and a radiator net area of the radiator device corresponds approximately at most the tenfold of the maximum height of the cover element. With other words the support element comprises an air guidance function, wherein the support element hereby is configured for example at most planar and/or comprises at least an (mainly or completely) air tight wall which comprises a planar and/or tube-like and or trapeze-like configuration in the direction of the radiator devices. The wall is preferably configured in a way that the greatest area (cover area) of the wall is adjusted mainly in parallel to the airflow (in the open position). A length of the cover element thereby corresponds to the overall greatest extension of the cover element (for example in longitudinal direction) or the greatest extension of the cover element along or in direction parallel to the axis of rotation of the cover element. The cover element is for example configured as a moveable lamella turnable about the axis of rotation in the closed and open position. The height corresponds preferably to the greatest extension of the cover element in the direction orthogonal to the length. With a cover element configured as an air flap therewith the length and the height configure a cover area which particularly corresponds to the greatest area of the cover element to closing the opening in the closed position. Length, height and a width of the cover element therewith configure the maximum extensions of the cover element in directions orthogonal to one another, wherein the length is greater than the height and the height is greater than the width of the cover element. By a preferably close assembly of the regulation device at the radiator device the guidance of the airflow is simplified and by a direct connection of the regulation device at the radiator device further the mounting effort is reduced since additional fastening elements can be avoided. The distance between the cover element and the radiator net area can thereby, if necessary, correspond at most the eightfold or at most the fivefold or at most the twofold of the maximum height and/or width of the cover element. The regulation device hereby configures an air passage for the guidance (passage) of the airflow itself, such that a separate air passage or a separate air guidance can be avoided.

Preferably, it can be intended with the invention that the regulation device is assembled above or underneath an air passage assembled of the radiator device and configured separately from the regulation device. Thereby, it is intended that the regulation device can at least partially replace a necessary air guidance, particularly an air passage. When the regulation device therewith only covers a part of the radiator net area and/or regulates and/or guides only a certain part of the total airflow, for the remaining area or the remaining airflow further an air passage has to be intended. Hereby, a reliable air guidance and therewith cooling by the radiator device is ensured.

Preferably, it can be intended with the invention that the at least one cover element, particularly, an air flap is configured for the at least partial closure of the opening in the closed position and for the at least partial release of the opening in the open position. The cover element can thereby for example be configured as an air flap or as a roller blind. Thereby, it is possible that the cover element for a movement in the closed position and/or open position is configured pivotably mounted and/or windable and/or coilable and/or shiftable. A moveable bearing of the cover element, which is preferably configured as a lamella, hereby enables a simple and fast movement from the open position into the closed position.

In a further possibility it can be intended that the support element comprises a bearing means for the acceptance and/or moveable bearing of the cover element. The bearing means can thereby for example be an acceptance for the bearing journal of the cover element. The bearing can thereby preferably occur on two opposing sides of the cover element in longitudinal direction (for example in direction of the axis of rotation) of the cover element. Therewith, a reliable closure of the opening is ensured.

In a further possibility it can be intended that the cover element comprises at least one cover means for closing the opening in the closed position and at least one bearing element connected to the cover means for the bearing in the support element. The bearing element is thereby for example a journal particularly configured cylinder-like and preferably acts together with the bearing means of the support element for the moveable bearing of the cover element. Thereby, it is further possible that the cover means is stored by the bearing elements in the support in a way that the cover means is moveable in the closed position and the open position for the at least partial release of the opening. The cover means thereby preferably serves for the direct closure of the opening of the airflow and herefore comprises for example a cover area. In this manner a reliable entry of the airflow in the closed position through the opening through the cover means can be avoided.

Likewise a subject matter of the invention is a regulation device for regulating an airflow to the radiator device for cooling at least a vehicle component of a vehicle wherein the regulation device comprises at least a support element for the acceptance of at least a cover element and wherein the airflow is guidable through at least one opening of the regulation device to the cooler device. Hereby it is intended that the regulation device can directly be assembled at the radiator device in a way that the airflow is guidable directly through the regulation device to the radiator device. Therewith, the regulation device according to the invention comprises the same advantages like they are already described in relation to the radiator system according to the invention. Further, the regulation device can be suitable to be used in a radiator system according to the invention.

Likewise subject matter of the invention is a method for mounting a regulation device at the radiator device for cooling at least one vehicle component of a vehicle wherein the airflow is guidable through at least one opening of the regulation device to the radiator device, wherein particularly the regulation device is configured for regulating an airflow to the radiator device and wherein the regulation device comprises at least a support element for the acceptance of at least a cover element. Hereby it is intended that the regulation device is directly assembled at the radiator device in a way that the airflow is guidable directly through the regulation device to the radiator device. Therewith, a method according to the invention comprises the same advantages like they are already described in relation to the radiator system according to the invention and/or a regulation system according to the invention. Further, the method can be suitable to mount a radiator system according to the invention and/or a regulation device according to the invention. The assembly can thereby occur for example by screws and/or clips and/or rivets and/or by gluing and/or by welding.

Further advantages, features and details of the invention result from the subsequent description in which with relation to the drawings embodiments of the invention are described in detail. Hereby, the features described in the claims and in the description can be essential for the invention each single by themselves or in any combination. It is shown:

DETAILED DESCRIPTION

In the subsequent figures the identical reference signs are used for the same technical features also from different embodiments.

Figure 1:
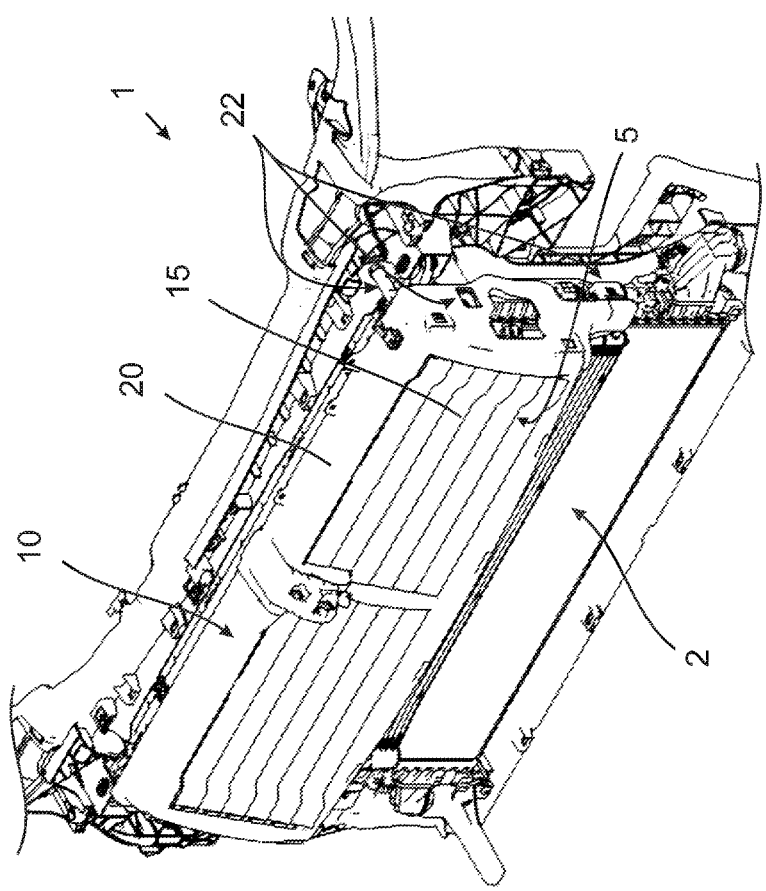
FIG. 1 a schematic perspective view of a radiator system according to the invention, FIG. 2*a* a schematic top view of a cover element, FIG. 2*b* a sectional view of the cover element along the line A-A, FIGS. 3 to 5 a schematic lateral view of a radiator system according to the invention, FIG. 6 a schematic lateral view of a common radiator system, FIGS. 7 to 9 a schematic lateral view of a radiator system according to the invention, FIG. 10 a schematic perspective view of a radiator system according to the invention, FIG. 11 a schematic top view of a radiator system according to the invention, FIG. 12 a schematic representation for visualizing a method according to the invention.

FIG. 1 schematically shows a radiator system 1 according to the invention. Thereby, it is recognizable that the regulation device 10 of the radiator system 1 according to the invention is directly assembled at the radiator device 2 of the radiator system 1. The regulation device 10 according to the invention comprises multiple cover elements 15 which at least partially close an opening 5 (meaning possibly multiple openings 5) in a closed position. Hereby, a regulation of an airflow 4 for the radiator device 2 is enabled, wherein through the regulation device 10 the airflow 4 is guidable also directly to the radiator device 2. For the direct assembly of the regulation device 10 at the radiator device 2 a support element 20 is intended which hereby likewise serves for the acceptance of the cover element 15. The support element 15 comprises multiple arresting means 22 for the assembly which are for example intended in the lateral area of the support element 20. The arresting means 22 thereby are preferably adjusted to the radiator device 2 such that an assembly directly at the radiator device 2 is enabled. Thus, the arresting means 22, for example, as latching means can interact with complementary arresting elements of the radiator device 2, for example, with counter arresting means in order to enable a reliable arresting.

Figure 2A:
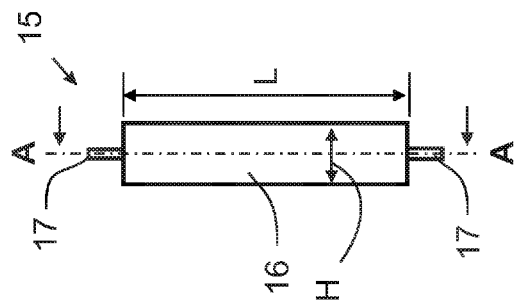
Figure 2B:
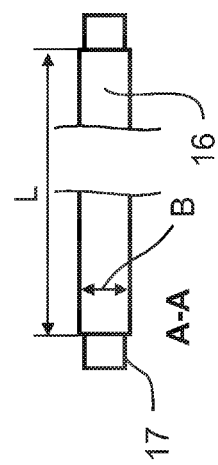

In FIG. 2a a view of the cover element 15 is shown, wherein the cover element 15 comprises a cover means 16 and two bearing elements 17. The bearing elements 17 thereby serve for the moveable bearing in the support element 20, wherein the support element 20 herefore comprises bearing means 21. The bearing means 21 thereby serve, for example, for the moveable and particularly pivotable acceptance of the bearing elements 17. The cover means 16 comprises a cover area which is configured by a height H and a length L. In a closed position this cover area is particularly mainly parallel to the opening 5 such that an air entry through the opening 5 is avoided and/or the cross section of the opening 5 is reduced. In FIG. 2b a sectional view (turned about 90°) through the cover element 15 in the line A-A shown in FIG. 2a is shown. Thereby, it can be recognized that the cover element 15 and/or the cover means 16 comprises a width B in a direction orthogonal to the length L and height H, which is preferably much smaller than the height H. In an open position a guidance of the airflow 4 occurs particularly above and/or underneath the width B along (parallel to) the cover area.

Figure 6:
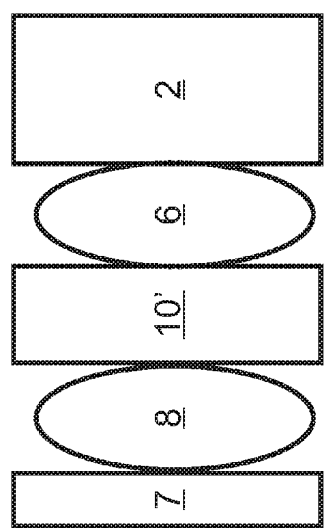
Figure 7:
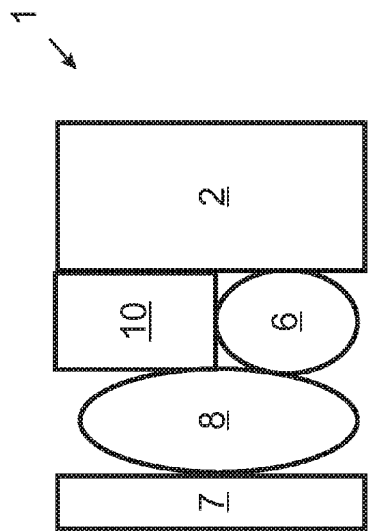
Figure 8:
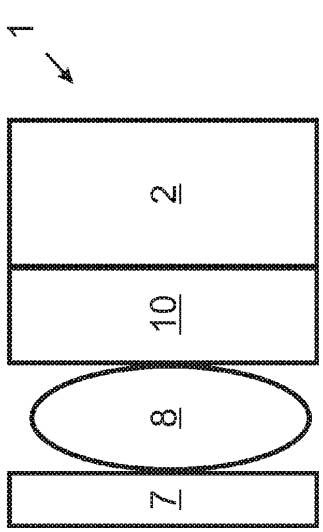
Figure 9:
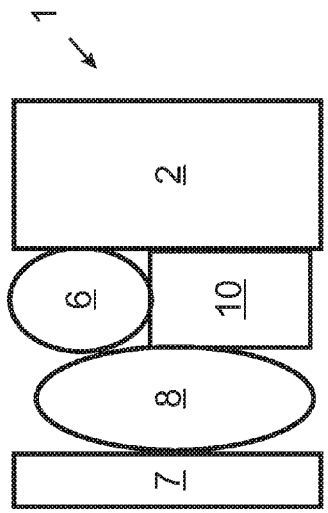

In FIGS. 3, 4, 5 possible assemblies of the regulation device 10 according to the invention are shown as examples. The representations are schematic, wherein the connection or assembly of the regulation device 10 at the radiator device 2 is given but not explicitly shown. The radiator device 2 comprises thereby for example a water cooler 2.3, wherein further components like an intercooler 2.2 and/or a capacitor 2.3 can be intended. Naturally, also further or other components can be intended also in another assembly. The regulation device 10 according to the invention can thereby for example cover an upper area of the radiator device 2 like shown in FIG. 3 and/or cover a lower area of the radiator device 2 like shown in FIG. 4 and/or can cover the whole area of the radiator device 2 like shown in FIG. 5. According to FIGS. 3 and 5 thereby an assembly of the regulation device 10 occurs possibly also in the upper area of the radiator device 2, wherein according to FIG. 4 an assembly of the regulation device 10 is performed for example (exclusively) in the lower area (for example the lower half) of the radiator device 2. In the covered areas of the radiator device 2 by the regulation device 10 therewith a conduction or guidance of the airflow 4 and the regulation of the airflow 4 for the radiator device 2 is enabled. In order to achieve a reliable guidance or conduction of the airflow 4 for the not covered areas, additionally to the regulation device 10 at least a rear air passage 6 (radiator air passage 6) can be intended. Such an assembly is schematically shown in FIG. 7 and FIG. 9. Thereby, for example starting from the embodiment according to FIG. 3, in FIG. 7 a radiator air passage 6 is assembled underneath the regulation device 10 according to the invention. Differently, in FIG. 9 the radiator air passage 6, for example starting from the embodiment according to FIG. 4, is assembled above the regulation device 10. Alternatively, it can be intended according to FIG. 8 that no air passage for guidance and/or conduction of the airflow 4 is intended in a direct manner to the radiator device 2 and therewith exclusively the regulation device 10 serves for guidance and/or conduction of the airflow 4 directly and/or immediately to the radiator device 2. In contrast to a common assembly of known regulation devices 10' according to FIG. 6, thereby components and construction space can be saved and the mounting can be simplified. Thereby, it can be seen that in FIG. 6 the common regulation device 10' is not assembled directly at the radiator device 2 and therewith no direct connection and/or guidance of the airflow 4 is performed to the radiator device 2. Instead between the regulation device 10 and the radiator device 2 an air guidance, particularly a radiator air passage 6, is intended. According to the embodiments which are shown in FIGS. 7 to 9 it is further possible that a separate frontal air passage 8 or a cooling air grid 8 is intended between the cooling grid 7 and the regulation device 10 according to the invention. Alternatively, this air passage can be avoided.

Figure 10:
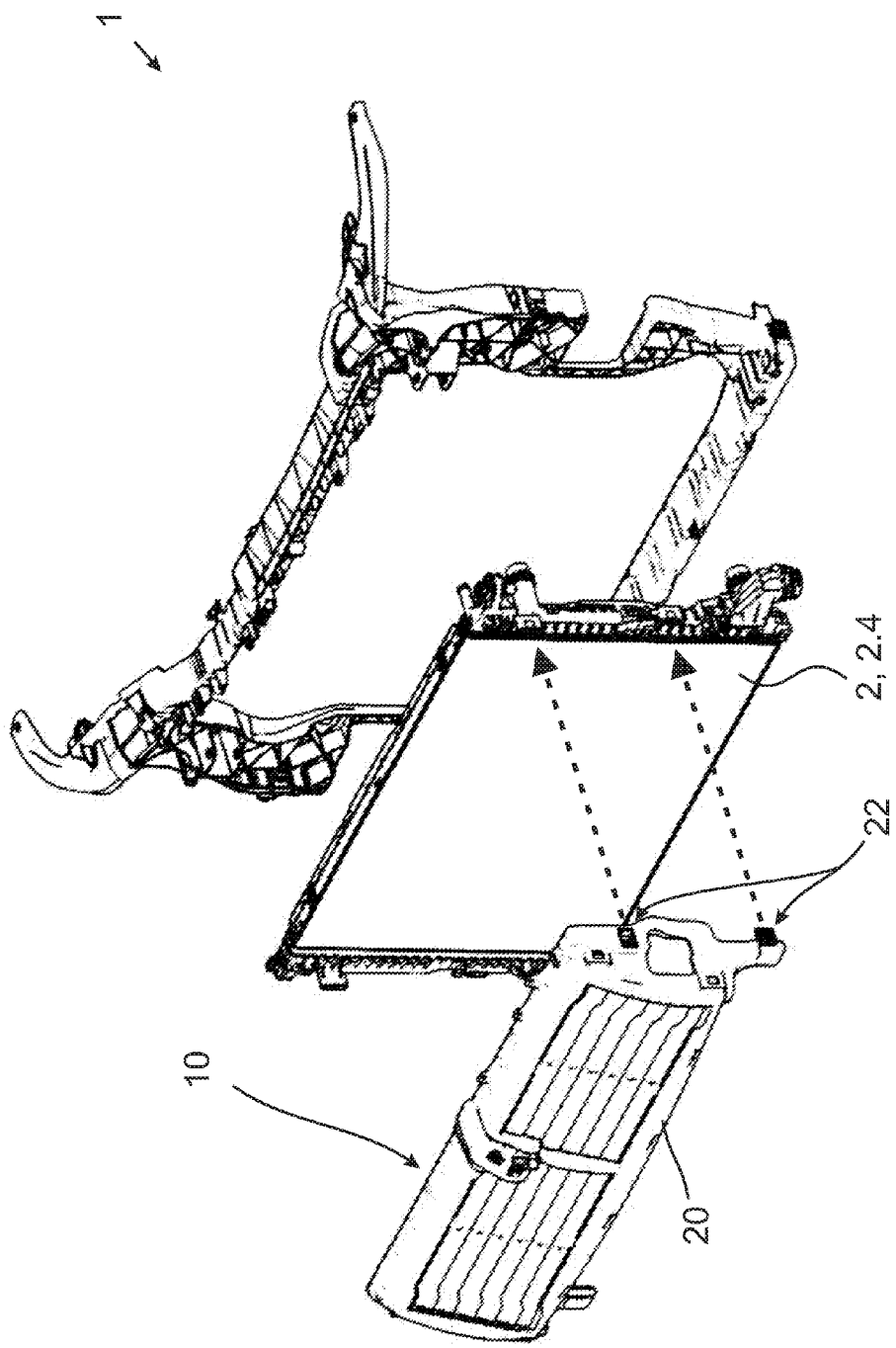

In FIG. 10 an assembly or mounting of a regulation device 10 according to the invention is shown, particularly according to a method 200 according to the invention. Thereby, the assembly of the regulation device 10 occurs particularly by arresting means 22 of the support element 20 directly at the radiator device 2. Hereby, at least a partial area of the radiator net surface 2.4 of the radiator device 2 is covered by the regulation device 10.

In FIG. 11 a top view of the cover element 15 is shown. The direct assembly of the regulation device 10 according to the invention and the radiator device 2 bears the advantage that a distance AB shown in FIG. 11 between a cover element 15 or a cover means 16 and the radiator device 2 is reduced. Hereby, an improved air guidance and regulation of the airflow 4 is enabled.

In FIG. 12 a method 200 according to the invention is shown schematically. Thereby, according to a first method step 200.1 a regulation device 10 is assembled directly at the radiator device 2. According to a second method step 200.2 the regulation device 10 is for example assembled resolvably and/or irresolvably with the radiator device 2.

The previous description of the embodiments describes the present invention only within the scope of examples. Naturally, single features of the embodiments as far as technically meaningful can be freely combined with one another without leaving the scope of the invention.

REFERENCE LIST

1 Radiator system
2 Radiator device
2.1 Capacitor
2.2 Intercooler
2.3 Water cooler
2.4 Radiator net surface
4 Airflow
5 Opening
6 Radiator air passage, rear air passage
7 Cooling grid
8 Cooling grid air passage, front air passage
10 Regulation device
15 Cover element, ventilation flap
16 Cover means
17 Bearing element
20 Support element
21 Bearing means
22 Arresting means
200 Method
200.1 First method step
200.2 Second method step
H Height
B Width
L Length
AB Distance

The invention claimed is:
1. A radiator system for a vehicle comprising:
   a radiator device for cooling at least one vehicle component of the vehicle, and
   at least one regulation device for regulating an airflow to the radiator device wherein the regulation device com- prises at least one support element for the acceptance of at least one cover element, and wherein the airflow is guidable to the radiator device through at least one opening of the regulation device wherein, the regulation device is directly assembled at the radiator device in a way that the airflow is guidable to the radiator device directly through the regulation device, the support element comprises at least two arresting members selected from the group consisting of a clip, a screw and a plug, wherein the arresting members are positioned on a lateral area of the support element for the direct assembly at the radiator device, and the radiator device comprises at least two complementary arresting members selected from the group consisting of an opening and a guidance, wherein the complementary arresting members are positioned on a lateral area of the radiator device and are complementary to and engage the arresting members of the support element.

2. The radiator system according to claim 1, wherein, the radiator device is a water cooler of the vehicle, wherein the support element is directly assembled at plastic water boxes of the water cooler.

3. The radiator system according to claim 1, wherein, the regulation device is assembled at the radiator device in a way that the support element is at least partially tightly connected at the radiator device.

4. The radiator system according to one claim 3, wherein, the support element contacts at least partially directly the radiator device.

5. The radiator system according to claim 1, wherein, at least the support element or at least one cover element of the regulation device is configured as a casting component.

6. The radiator system according to one claim 5, wherein, the support element and at least an arresting member configure a monolithic component for the direct assembly at the radiator device.

7. The radiator system according to claim 1, wherein, the regulation device covers at least 20% to 60% of a radiator net surface of the radiator device.

8. The radiator system according to claim 7, wherein, the regulation device covers at least 20% to 60% of a radiator net surface of the radiator device in the closed position by the cover elements.

9. The radiator system according to claim 1, wherein, the regulation device configures an air passage for a guidance of the airflow to the radiator device.

10. The radiator system according to claim 9, wherein, the distance between the cover element of the regulation device and a radiator net surface of the cooler device correspond approximately at the most the tenfold of the maximum height of the cover element.

11. The radiator system according to claim 1, wherein, the regulation device is assembled at an air passage assembled above or underneath at the radiator device and separately configured by the regulation device.

12. The radiator system according to claim 1, wherein, the at least one cover element is configured for at least partially closing the opening in a closed position and for at least partially releasing the opening in an open position.

13. The radiator system according to claim 1, wherein, the support element at least comprises at least one bearing element for the acceptance or moveable bearing of the cover element.

14. The radiator system according to claim 1, wherein, the cover element comprises at least one cover means for covering the opening in the closed position and at least one bearing element connected to the cover means for bearing in the support element.

15. The radiator system according to claim 1, wherein, the arresting members are selected from the group consisting of a clip and a screw.

16. A regulation device for regulating an airflow to a radiator device for cooling of at least one vehicle component of a vehicle wherein the regulation device comprises at least one support element for the acceptance of at least one cover element and wherein the airflow is guidable to the radiator device through at least one opening of the regulation device wherein, the regulation device is attachable directly at the radiator device in a way that the airflow is guidable to the radiator device directly through the regulation device, the support element comprises at least two arresting members selected from the group consisting of a clip, a screw and a plug, wherein the arresting members are positioned on a lateral area of the support element for direct assembly at the radiator device, and the radiator device comprises at least two complementary arresting members selected from the group consisting of an opening and a guidance, wherein the complementary arresting members are positioned on a lateral area of the radiator device and are complementary to and engage the arresting members of the support element.

17. The regulation device according to claim 16, wherein, the regulation device is configured for the use in a radiator system for a vehicle comprising:

a radiator device for cooling at least one vehicle component of the vehicle, at least one regulation device for regulating an airflow to the radiator device wherein the regulation device comprises at least one support element for the acceptance of at least one cover element, and wherein the airflow is guidable to the radiator device through at least one opening of the regulation device wherein, the regulation device is directly assembled at the radiator device in a way that the airflow is guidable to the radiator device directly through the regulation device.

18. A method for mounting a regulation device for regulating an airflow at the radiator device for cooling of at least one vehicle component of a vehicle wherein the airflow is guidable to the radiator device through at least one opening of the regulation device and wherein the regulation device comprises at least one support element for the acceptance of at least one cover element wherein, the regulation device is assembled directly at the radiator device in a way that the airflow is guidable to the radiator device directly through the regulation device, the support element comprises at least two arresting members selected from the group consisting of a clip, a screw and a plug, wherein the arresting members are positioned on a lateral area of the support element for the direct assembly at the radiator device, and the radiator device comprises at least two complementary arresting members selected from the group consisting of an opening and a guidance, wherein the complementary arresting members are positioned on a lateral area of the radiator device and are complementary to and engage the arresting members of the support element.

19. The method according to claim 18, wherein, the method serves at least for mounting a regulation device for regulating an airflow to a radiator device for cooling of at least one vehicle component of a vehicle wherein the regulation device comprises at least one support element for the acceptance of at least one cover element and wherein the airflow is guidable to the radiator device through at least one opening of the regulation device wherein, the regulation device is attachable directly at the radiator device in a way that the airflow is guidable to the radiator device directly through the regulation device or for a radiator system for a vehicle comprising:

a radiator device for cooling at least one vehicle component of the vehicle, at least one regulation device for regulating an airflow to the radiator device wherein the regulation device comprises at least one support element for the acceptance of at least one cover element, and wherein the airflow is guidable to the radiator device through at least one opening of the regulation device wherein, the regulation device is directly assembled at the radiator device in a way that the airflow is guidable to the radiator device directly through the regulation device.

* * * * *